Sept. 30, 1969  F. V. GUERRERO  3,469,864
CONDUIT CONNECTOR
Filed June 19, 1967

INVENTOR
FERNANDO V. GUERRERO
BY
William A. Mikesell Jr.
ATTORNEY

United States Patent Office 3,469,864
Patented Sept. 30, 1969

3,469,864
CONDUIT CONNECTOR
Fernando V. Guerrero, Solon, Ohio, assignor to Continental Oil Company, Ponca City, Okla., a corporation of Delaware
Filed June 19, 1967, Ser. No. 647,153
Int. Cl. F16l 37/00
U.S. Cl. 285—308        5 Claims

ABSTRACT OF THE DISCLOSURE

Restraining clamp for holding two conduits in endwise engagement. One end is fixed to a first conduit, and the other end engages the second conduit by encircling a protrusion thereon; the encircling member is held in a closed engaging configuration by a sliding clip.

---

Figure 1:
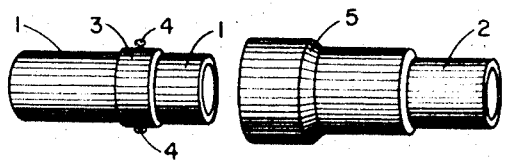

This invention relates to a clamp for holding two pieces of conduit in endwise engagement with each other.

Many arrangements are available for coupling conduit pieces into essentially permanent engagement, such as threaded coupling joints, bolted flange joints, and couplings secured to the conduit by adhesive. However, certain applications of conduit desirably utilize couplings which can be quickly and easily engaged and released, i.e., which are of a temporary nature. Examples of such applications include moveable irrigation piping, and plumbing around a construction site.

It is an object of this invention to provide a clamping device adapted to quickly and easily couple two sections of conduit in axial engagement.

It is another object of this invention to provide a clamping device which can be readily released, allowing two sections of conduit locked in axial engagement to be disengaged.

Figure 2:
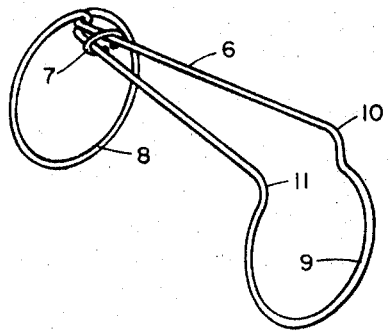
Figure 4:
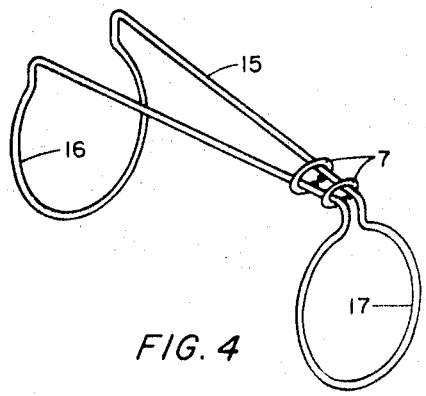
Figure 3:
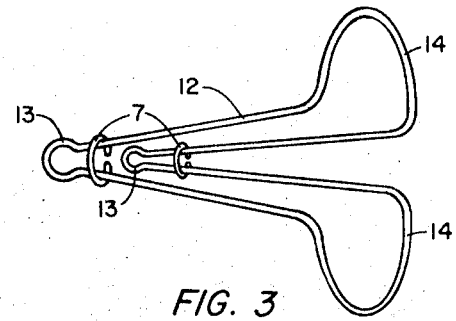

Other objects and the several advantages of this invention will become apparent upon study of this disclosure, the appended claims, and the drawing, in which:

FIGURE 1 is a schematic representation of two pieces of conduit having end fittings suitable for engagement by the restraining clamp of this invention, and FIGURES 2, 3 and 4 are representations of three embodiments of the clamp of this invention.

Reference is now made to the drawing, and to FIGURE 1 in particular. First and second conduits 1 and 2, respectively, are desired to be coupled in axial engagement to allow fluid flow from one to the other. Conduits 1 and 2 are each provided with a protrusion on their outer surface, near the ends to be coupled. In a simple embodiment, this can comprise an annular collar 3 on conduit 1, which slips over the O.D. of the conduit and can be fastened thereto by threads, cementing, soldering, welding, or other suitable means. When the clamp of FIGURE 3 is used, this collar 3 can also be provided with a pair of oppositely disposed protruding lugs 4, as will be further explained later. The protrusion on conduit 2 will normally comprise a coupling 5, as known in the art. Coupling 5, here shown as a bell, is permanently fixed to the end of conduit 2 as by threading, welding, soldering or cementing. This coupling 5 is, at its other end, of an I.D. adapted to receive the end of conduit 1 in sliding engagement, and the interior of coupling 5 can be provided with an O-ring or other gasket, not shown, to prevent leakage around the outside of the received end of conduit 1. In use, the end of conduit 1 is slid into coupling 5, and a clamp of the present invention is then fastened "behind" collar 3 and also "behind" a suitable enlargement of coupling 5 so as to retain the two conduits 1 and 2 in this engaged position. By "behind" is meant, with respect to the orientation in FIGURE 1, to the left of collar 3 and to the right of a suitable enlargement of coupling 5, such as the flared portion or the end thereof.

The restraining clamp of FIGURE 2 comprises an "endless" resilient member, indicated generally as 6, and a clip 7. Member 6 is formed such that one end 8 will fit around either conduit 1 or 2 but will not pass the enlargement comprising collar 3 or coupling 5. The second end 9 of member 6 is similarly sized to not pass an enlargement when shoulders 10 and 11 are brought into close proximity to each other. Member 6 can be so formed from its resilient material that, in its relaxed condition, shoulders 10 and 11 are spaced apart by a substantial distance, e.g., approximately the O.D. of the conduit to be fastened or somewhat less, or that shoulders 10 and 11 are in close proximity; the former is presently preferred. In using this embodiment of the clamp, end 8 must be placed onto either conduit 1 or conduit 2 prior to the permanent attaching of collar 3 or coupling 5. Then, when the two conduits are slid into engagement, end 9 of member 6 is slipped onto the other conduit so as to virtually surround it. Shoulders 10 and 11 are then squeezed together into close proximity, and clip 7 is slid along member 6 toward end 9 so as to hold these shoulders together. Member 6 is so sized that the length between ends 8 and 9 is just sufficient to span the appropriate enlargements on conduits 1 and 2 when these latter are in an engaged position. It can thus be seen that end 8 of the clamp, being "behind" the enlargement provided by either collar 3 or coupling 5, and end 9 of the clamp being "behind" the other enlargement, co-act to retain the two conduits in an engaged position by preventing axial movement. The two conduits can be readily uncoupled by sliding clip 7 toward end 8, and disengaging end 9 from around the conduit.

The embodiment of FIGURE 3 again comprises an "endless" resilient member 12, so shaped that end loops 13 are adapted to engage protrusions 4 of collar 3, FIGURE 1. Opposite ends 14 each comprise approximately a semicircle, and are suitably sized to fit "behind" an appropriate protrusion of coupling 5. Sliding clips 7 perform a function on the present clamp similar to that in FIGURE 2, i.e., they allow semicircular ends 14 to be opened for receiving a conduit when they are toward ends 13, and they hold the clamp in a closed position when slid toward ends 14.

The embodiment of FIGURE 4 comprises an "endless" resilient member 15 having respective end loops 16 and 17, and two sliding clips 7. To install this clamp onto a pair of axially engaged conduits so as to restrain axial movement thereof, both clips 7 are first slid to one end of clamp 15, and the opposite end is positioned around one conduit. Then both clips 7 are slid to the end so positioned, and the opposite end is positioned around the other conduit. Finally, one of the clips 7 is then slid back to the other end.

The material of clamp bodies 6, 12 and 15 is spoken of as being resilient and "endless." Obviously, if the clamp is made of, e.g., spring wire, an endless loop is impractical, but the two ends can be fastened together as by welding. However, depending on the strength of the material, the ends do not in fact need to be actually fastened together to form an endless structure, but rather need only be able to maintain the general configuration shown in the drawing. Body 6, 12 or 15, and for that matter, clips 7 can be fabricated of any suitable material such as a metal or plastic. The body members of all embodiments can be so formed as to be, in their relaxed condition, either in an open condition as in end 16 of FIGURE 4 or a closed condition as in end 17 of FIGURE 4, although the former is presently preferred as tending to hold clips 7 in position better.

It will be obvious that the size of any given end loop in its closed condition is designed to fit the circumference of the conduit closely, and to rest "behind" a suitable protrusion on the conduit so as to prevent the conduit from moving axially away from and thus out of engagement from the other conduit. Thus, depending on the nature of the collar 3 and the coupling 5, it is obvious that the two end loops, of the FIGURE 2 and FIGURE 4 embodiments, can be of different size on a given clamp. Further, it is obvious that the length of the clamp will also depend upon design and spacing of collar 3 and coupling 5.

The longitudinal members of the clamp are preferably offset, as shown in the drawing, near the end loops so as to provide clearance around such intervening protrusions as the flared bell of coupling 5.

Although this invention has been described with respect to particular embodiments thereof, it is not to be so limited, as changes and modifications may be made therein which are within the spirit and scope of the invention.

What is claimed is:

1. Device for clamping two conduits in axial engagement comprising a slender resilient member so formed as to include a pair of longitudinal members, means extending longitudinally therefrom, arcuate means at one end of said pair encompassing about 180° arc and adapted to engage a projection on one of said conduits, each end of said arcuate means being fastened to a first end of said pair, said arcuate means being in a plane substantially perpendicular to said pair, means at the other end of said pair comprising a hook means on each of said other ends adapted to engage a pair of projections on said other of said conduits, and clip means attached to and slideable along each of said longitudinally members and said longitudinally extending means between a first position in which said arcuate means is retained in engagement with said projection on said one conduit by said clip means and a second position in which said arcuate means can disengage from said latter mentioned projection.

2. The device of claim 1 further provided with a second arcuate means encompassing about 180° arc and wherein said longitudinally extending means comprises a second pair of longitudinal members, said second arcuate means joining first ends of said second pair of longitudinal members and being in a plane substantially perpendicular thereto, the second ends of said second pair of longitudinal members joining said hook means, and said clip means comprising two slideable clip means, one being slideable on each of those two sets of longitudinal members emanating from a given hook means.

3. Device for clamping two conduits in axial engagement comprising a slender resilient member so formed as to include a pair of longitudinal members, first arcuate means at one end of said pair encompassing about 360° arc and adapted to engage a projection on one of said conduits, each end of said first arcuate means being fastened to a first end of said pair, said first arcuate means being in a plane substantially perpendicular to said pair, means at the other end of said pair comprising a second arcuate means of substantially the same configuration as the first-mentioned arcuate means and attached to said other end of said pair, said second arcuate means being adapted to engage a projection on the other of said conduits, and a plurality of clip means attached to and slideable along each of said longitudinal members between a first position in which said first arcuate means is retained in engagement with said projection on said one conduit by said clip means and said second arcuate means can disengage from said projection on said other of said conduits and a second position in which said first arcuate means can disengage from said projection on said one conduit and said second arcuate means is retained in engagement with said projection on said other of said conduits by said clip means.

4. A pipe joint comprising:
   (a) a first pipe having a protrusion on its external surface near an end thereof;
   (b) a second pipe having an end engaged in fluid-carrying relationship with said end of said first pipe, and having a pair of protrusions on its external surface near its said end; and
   (c) a device for restraining axial movement of said end of said first pipe away from said end of said second pipe, said device comprising a slender resilient member so formed as to include a pair of longitudinal members substantially parallel to the axis of and adjacent the exterior surface of said ends, means extending longitudinally therefrom, arcuate means encompassing about 180° arc at one end of said pair engaging said protrusion on said first pipe, each end of said arcuate means being fastened to a first end of said pair and said arcuate means being in a plane substantially perpendicular to said pair, hook means on each of said other ends engaging said pair of protrusions on said second pipe, and clip means attached to and slideable along each of said longitudinal members and said longitudinally extending means between a first position in which said arcuate means is retained in engagement with said protrusion by said clip means and a second position in which said arcuate means can disengage from said protrusion.

5. A pipe joint comprising:
   (a) a first pipe having a protrusion on its external surface near an end thereof;
   (b) a second pipe having an end engaged in fluid-carrying relationship with said end of said first pipe, and having a protrusion on its external surface near its end; and
   (c) a device for restraining axial movement of said end of said first pipe away from said end of said second pipe, said device comprising a slender resilient member so formed as to include a pair of longitudinal members substantially parallel to the axis of and adjacent the exterior surface of said ends, first arcuate means encompassing about 360° arc at one end of said pair engaging said protrusion on said first pipe, each end of said first arcuate means being fastened to a first end of said pair and said first arcuate means being in a plane substantially perpendicular to said pair, means at the other end of said pair comprising a second arcuate means of substantially the same configuration as said first arcuate means and attached to said other end of said pair, said second arcuate means engaging said protrusion on said second pipe, and a plurality of clip means attached to and slideable along each of said longitudinal members between a first position in which said first arcuate means is retained in engagement with said protrusion on said first pipe by said clip means and said second arcuate means can disengage from said protrusion on said second pipe and a second position in which said first arcuate means can disengage from said protrusion on said first pipe and said second arcuate means is retained in engagement with said protrusion on said second pipe by said clip means.

References Cited
UNITED STATES PATENTS
| | | | |
|---|---|---|---|
| 603,366 | 5/1898 | Riehl | 285—414 X |
| 614,116 | 11/1898 | Losee. | |
| 721,577 | 2/1903 | Linder | 285—241 X |
| 770,982 | 9/1904 | Plassmann. | |
| 883,220 | 3/1908 | Middlebrook. | |
| 996,340 | 3/1911 | Hopkins. | |
| 2,036,655 | 4/1936 | Storaasli. | |
| 2,753,536 | 7/1956 | Tjader. | |

EDWARD C. ALLEN, Primary Examiner

D. W. AROLA, Assistant Examiner

U.S. Cl. X.R.

24—81; 285—406, 420